Dec. 28, 1937.  E. W. MILLER  2,103,911
HELICAL GEAR SHAPING MACHINE
Filed March 8, 1935   2 Sheets-Sheet 1

Inventor
Edward W. Miller
by Wright, Brown, Quinby & May
Attys

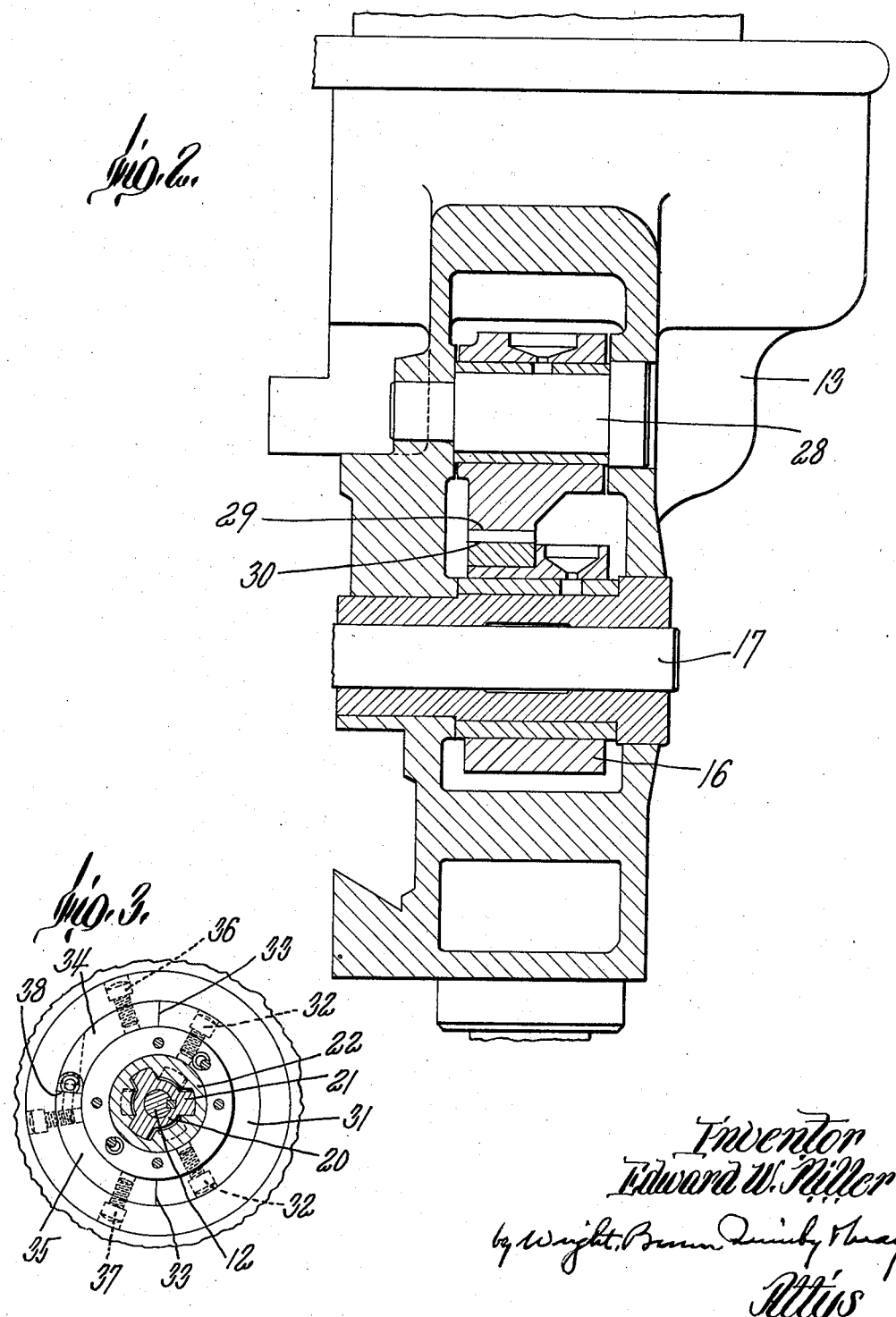

Patented Dec. 28, 1937

2,103,911

UNITED STATES PATENT OFFICE 2,103,911

HELICAL GEAR SHAPING MACHINE

Edward W. Miller, Springfield, Vt., assignor to The Fellows Gear Shaper Company, Springfield, Vt., a corporation of Vermont Application March 8, 1935, Serial No. 9,969

11 Claims. (Cl. 90—9)

This invention relates to machines for shaping helical gears, and performing analogous cutting operations by the action of a cutter which is reciprocated and at the same time given a motion of partial rotation such that it advances and recedes in a helical path. More specifically, it relates to gear shaping machines organized to cut helical gear teeth, and analogous or related articles, by a gear-like cutter having helical teeth and being reciprocated with a twisting motion.

Machines of the type herein shown for illustration of the invention are provided with reciprocatable and rotatable cutter spindles, and the twisting motion by which the cutter teeth are caused to follow helical paths while advancing and retreating is imparted by complemental helical guide elements, one of which is carried by the spindle and the other is mounted on a contiguous part of the machine. Propelling force is applied to the spindle for reciprocating it; and its twisting movement is obtained by the interaction between the guide element on the spindle and the non-reciprocative guide element or elements.

Heretofore such guide elements have always had the same helical lead as the work to be cut, and one of the complemental elements has been prevented from moving lengthwise of the spindle. In gear shaping machines such non-reciprocative guide element has been affixed rigidly to the index wheel by which progressive generating rotation is transmitted to the cutter spindle and cutter; and has been relied on to impart rotation from the index wheel to the spindle. These factors have necessarily limited the helix angle of the guides to one small enough to avoid excessive frictional resistance when the spindle is reciprocated rapidly. Consequently it has not been possible to cut work, or use cutters, of which the helix angle of their teeth is greater than a given maximum. Moreover, when teeth of large helix angle had to be cut, it has been necessary to use cutters of relatively large diameter in comparison with the spindle in order that the helical guides may be small enough in diameter to come within the permissible helix angle. This has sometimes caused imperfections in the work due to the spindle not being sufficiently large and massive.

The purpose of the present invention is to enable larger helix angles to be cut and larger and more massive spindles to be used with cutters of given helix angle, than has been possible heretofore. This has been accomplished by making both cooperative parts of the helical guiding means axially movable, and by providing means for moving one of such parts simultaneously with the axial movement of the spindle, but in the opposite direction, thus imparting greater angular movement to the spindle without increasing the helix angle (or, in other words, shortening the lead) of the helical guide. The invention comprises not only the means hereinafter shown and described for effecting this object, but all substantial equivalents thereof. It further includes means for giving increments of rotation to the guide which is thus moved oppositely to the spindle, while it is being moved and by reaction against non-reciprocative guiding means.

Referring to the drawings,—

Fig. 2 is a detail section on the line 2—2 of Fig. 1;

Fig. 3 is a cross section on line 3—3 of Fig. 1.

Like reference characters designate the same parts wherever they occur in all the figures.

Figure 1:
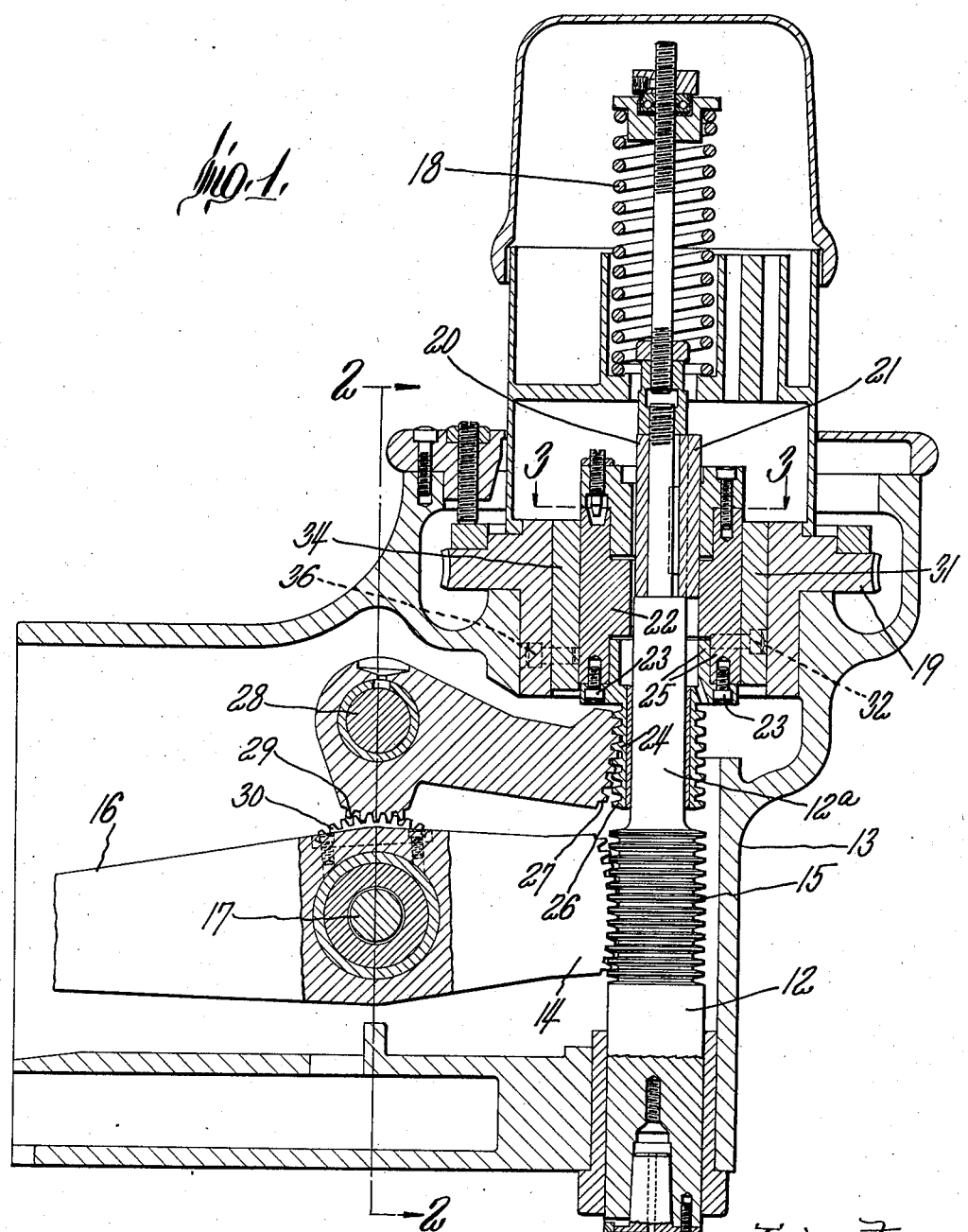
Fig. 1 is a vertical section through the cutter spindle of a gear shaping machine containing an embodiment of the invention.

The gear shaping machine here shown is of the same type as that disclosed in the Edwin R. Fellows Patent 1,662,109, dated March 13, 1928. Herein I have shown only so much of the machine as is necessary and sufficient to disclose the new steps in which the invention consists. Reference is directed to said patent for explanation of the principles of the balance of the machine.

A helical gear shaper cutter of well known character is shown at 11. It is secured to and carried by a cutter spindle 12 which rotates and reciprocates in suitable bearings in the cutter saddle or carriage 13. It is so reciprocated by a gear segment 14 meshing with encircling rack teeth 15 on the spindle, which segment is part of a lever 16 mounted to rock on a stationary pivot 17 and being rocked by a crank and connecting rod mechanism not shown. 18 represents the counterbalance spring with which such machines are usually provided. A worm wheel 19 surrounds the spindle coaxially and is rotated by a worm not shown. This is the so-called cutter index gear of the standard gear shaping machine, from which a progressive generative rotation is transmitted to the cutter in one direction through the guiding means presently described. As the cutter spindle is thus reciprocated, it is given a back and forth rotation (additional to the progressive rotation given by the index wheel) by helical guiding members. Such guiding members are shown best in Fig. 3, and consist of a collar 20 having helical splines or ribs 21, keyed to the spindle, and a sleeve 22 having internal helical guideways complemental to the helical splines 21. For convenience of description the collar 20 with its splines 21 will be called the helical guide, and the sleeve with its internal guideways will be called the helical guide sleeve. It will be understood that such helical guide and sleeve typify any corresponding guide means which may be provided for the same purpose.

The new step consists in mounting the helical guide sleeve so that it may reciprocate lengthwise of the cutter spindle, and in providing means for so reciprocating it simultaneously with the reciprocations of the spindle. The guide sleeve is secured, by bolts 23, to an extension sleeve 24 which has a close sliding fit on a part 12a of the spindle. In effect the sleeves 22 and 24 are one operative part, for they are coaxially centered by accurately fitted overlapping zones 25, and the bolts normally prevent their separation from one another.

The extension sleeve is provided with external encircling rack teeth 26 with which the teeth of a gear segment 27 mesh. This gear segment is mounted to oscillate on a pivot stud 28 and is joined to a segment 29 which meshes with a gear segment 30 secured to the rock lever 16 concentrically with the pivot axis of the latter. In effect the connected gear segments 27 and 29 form a bell crank lever having two arms bearing teeth at their extremities and meshing respectively with the cylindrical rack 26 and the gear segment 30.

The helical guide sleeve carries an external semi-cylindrical guide 31 (secured to it by bolts 32). The edges 33 (Fig. 3) of the guide 31 have sufficient radial width to serve as accurate guiding surfaces. They abut respectively against the contiguous edge surfaces of two gibs 34 and 35 which are fitted within the hub of the index wheel 19 and secured thereto by bolts 36, 37 respectively. The two gib members abut against each other at the surface 38 and are relatively adjustable, substantially as shown in said Fellows patent, in order to take up wear at the guide surfaces 33.

It will be readily apparent from the foregoing explanation that when the gear segment rock lever 14, 16 is operated to reciprocate the cutter spindle, it acts through the gear segments 30, 29 and 27 to reciprocate the helical guide sleeve 22 at the same time in directions which at all times are opposite to the direction in which the spindle is moving. With the construction here shown, in which the axes of pivots 17 and 28 are in a plane parallel to the cutter spindle axis, the pitch radii of segments 29 and 30 are equal, and the pitch radius of segment 27 with rack 26 is equal to that of segment 14 with rack 15, axial movements of the helical guide sleeve are at all times equal, as well as being opposite, to those of the spindle. But it is within my contemplation to alter these ratios so that either reciprocating member may move farther and faster than the other, if desired.

In its movements in this manner, the helical guide sleeve is guided by the outer guide faces 33. These latter in turn serve to transmit progressive rotation from the index worm wheel 19 to the helical guide sleeve, which latter rotation is imparted through the helical guide splines to the spindle.

The guide faces 33 may be either parallel with the spindle axis or helically inclined; and if helical, they may be of the same hand as that of the helical guide splines, or the opposite hand. When the guide surfaces 33 are straight (parallel to the spindle axis) the rotational oscillation imparted to the cutter spindle by the helical splines and guide sleeve is increased over that due to the endwise movement of the spindle alone in proportion to the ratio of the extent of motion of the guide sleeve to the opposite motion of the spindle. Thus assuming for instance, that the helical guide splines have a lead of five inches, then an endwise movement of the helical guide sleeve equal to that of the spindle will cause the cutter teeth to move in a path of which the lead is only two and a half inches. The lead of the cutter path may be still further shortened by making the guide faces 33 helical with a lead of opposite hand to that of the guide splines.

In short, the capacity for variation in the lead of the helical splines and of the guide faces 33, and the extent of movement of the helical guide sleeve, provide a wide scope for a great many variations in the helical path of the cutter. They enable the cutter to be traversed in a path of larger helix angle than has heretofore been known or believed to be possible, and enable larger and more massive helical guides to be used than have been possible heretofore without giving them an excessively large helix angle.

The helical movements of the cutter referred to in the foregoing description are relative to the index wheel. If the latter is rotated at the same time, as it is during the generation of gear wheels, the helical movements of the cutter with respect to stationary points are modified correspondingly. But so far as this explanation is concerned, the rotation of the index wheel may be disregarded.

The generic principles of this invention are not limited exclusively to gear cutting machines as distinguished from machine tools capable of cutting other helical forms. Neither are they limited in their application to the tool spindle or carrier rather than to the spindle or carrier of the work piece. For instance, a work piece may be mounted on the spindle 12, in substitution for the cutter 11, and carried thereby in a helical path past a non-reciprocating tool.

What I claim and desire to secure by Letters Patent is:

1. A machine tool comprising a rotatable and reciprocative spindle, means for reciprocating said spindle, helical guide means for imparting back and forth rotational movements to the spindle during its reciprocations in opposite directions, including a guide element secured to the spindle, a complemental helical guide element, means for reciprocating said complemental element oppositely to the reciprocations of the spindle and simultaneously therewith, and means for limiting such movements of said complemental element to a prescribed path.

2. A machine tool comprising a reciprocatively and rotatably mounted spindle, a collar secured to said spindle, a sleeve surrounding said collar, one of the elements comprised by said collar and sleeve having a helical spline and the other having a complemental guideway, means for imparting simultaneous and relatively opposite axial reciprocating movements to both the spindle and the sleeve, and guide means for the sleeve.

3. A machine tool comprising a reciprocatively and rotatably mounted spindle, a collar secured to said spindle, a sleeve surrounding said collar, one of the elements comprised by said collar and sleeve having a helical spline and the other having a complemental guideway, means for imparting simultaneous and opposite axial reciprocating movements to the spindle and sleeve, guide means for the sleeve, and means for rotating the last named guide means around the axis of the spindle.

4. A machine tool comprising a reciprocatively and rotatably mounted spindle, a sleeve surrounding said spindle with a reciprocative and rotative bearing thereon, complemental helicoidal guide surfaces carried by the spindle and sleeve respectively, in reactive contact with one another so as to impart rotation to the spindle consequent to relative axial reciprocation between spindle and sleeve, means for reciprocating the spindle and sleeve axially in relatively opposite directions at the same time, and guide means for the sleeve arranged to prevent rotation of the sleeve under the thrust of said helicoidal surfaces.

5. A machine tool comprising a reciprocatively and rotatably mounted spindle, a sleeve surrounding said spindle with a reciprocative and rotative bearing thereon, complemental helicoidal guide surfaces carried by the spindle and sleeve respectively, in reactive contact with one another so as to impart rotation to the spindle consequent to relative axial reciprocation between spindle and sleeve, means for reciprocating the spindle and sleeve axially in relatively opposite directions at the same time, and guide means for the sleeve arranged to impart an increment of rotation to the sleeve in consequence of its axial movement.

6. A machine tool comprising a reciprocatively and rotatably mounted spindle, a sleeve surrounding said spindle with a reciprocative and rotative bearing thereon, complemental helicoidal guide surfaces carried by the spindle and sleeve respectively, in reactive contact with one another so as to impart rotation to the spindle consequent to relative axial reciprocation between spindle and sleeve, means for reciprocating the spindle and sleeve axially in relatively opposite directions at the same time, and guide means for the sleeve extending in parallel with the axis of the spindle and sleeve.

7. A machine tool comprising a reciprocatively and rotatably mounted spindle, a sleeve surrounding said spindle with a reciprocative and rotative bearing thereon, complemental helicoidal guide surfaces carried by the spindle and sleeve respectively, in reactive contact with one another so as to impart rotation to the spindle consequent to relative axial reciprocation between spindle and sleeve, means for reciprocating the spindle and sleeve axially in relatively opposite directions at the same time, and guide means for the sleeve comprising complemental helicoidal abutting surfaces on the sleeve and on a non-reciprocative part of the machine, respectively.

8. In a gear shaping machine having a spindle, a coaxial gear wheel for imparting rotation to the spindle, and means for reciprocating the spindle; two sets of complemental guide members coaxially arranged between said spindle and gear wheel, comprising a helical guide mounted on the spindle, a guide sleeve having a helicoidal surface complemental to the helical guide, an external guide element on the sleeve and an internal guide element within the gear wheel, said last named guide element having abutting faces arranged to transmit rotation from the wheel to the sleeve while permitting independent axial movement of the latter by force applied thereto in the axial direction, said sleeve being axially movable with respect to both the spindle and the gear wheel; and means for so moving the sleeve oppositely to the reciprocating movements of the spindle and at the same time therewith.

9. In a gear shaping machine, an endwise movable and rotatable spindle having rack teeth, an oscillative gear segment meshing with said teeth for reciprocating the spindle, a sleeve fitted slidingly on the spindle and having rack teeth, a second gear segment meshing with the rack teeth on the sleeve, connections between said two gear segments for moving the second simultaneously with, and oppositely to, the movements of the first, and complemental abutting helicoidal guide surfaces on the spindle and sleeve respectively arranged to impart rotation to the spindle in consequence of relative axial reciprocation between the spindle and sleeve.

10. In a gear shaping machine having a rotatable and endwise reciprocatable spindle and a helical guide element carried thereby, a complemental helical guide element mounted for reciprocating movement lengthwise of the spindle and independently thereof, and means for reciprocating said spindle and said complemental guide element simultaneously.

11. In a gear shaping machine having a rotatable and endwise reciprocatable spindle and a helical guide element carried thereby, a complemental helical guide element mounted for reciprocating movement lengthwise of the spindle and independently thereof, mechanism coupled with the spindle for reciprocating it, mechanism coupled with the complemental guide element for reciprocating said element, and correlating means between said mechanisms for causing the reciprocating movements of the spindle and guide means to take place simultaneously and oppositely to one another.

EDWARD W. MILLER.